United States Patent
Rasheed et al.

(10) Patent No.: US 10,423,712 B2
(45) Date of Patent: Sep. 24, 2019

(54) CREATING AND MANAGING CHATTELS TO CONTROL DESIGN ASSET BEHAVIORS

(71) Applicant: Adobe Inc., San Jose, CA (US)

(72) Inventors: Fabin Rasheed, Alazppuzha (IN); Logashwar Venkatrayalu Krishnamurth, Cuddalore (IN)

(73) Assignee: Adobe Inc., San Jose, CA (US)

( * ) Notice: Subject to any disclaimer, the term of this patent is extended or adjusted under 35 U.S.C. 154(b) by 163 days.

(21) Appl. No.: 15/489,386

(22) Filed: Apr. 17, 2017

(65) Prior Publication Data

US 2018/0300299 A1    Oct. 18, 2018

(51) Int. Cl.
| | |
|---|---|
| G06F 7/04 | (2006.01) |
| H04L 29/06 | (2006.01) |
| H04L 9/32 | (2006.01) |
| G06F 17/22 | (2006.01) |
| G06Q 10/10 | (2012.01) |

(52) U.S. Cl.
CPC ....... G06F 17/2288 (2013.01); G06Q 10/101 (2013.01)

(58) Field of Classification Search
CPC .......................... G06F 17/2288; G06Q 10/101
USPC .................. 726/21, 27, 30; 713/165, 168
See application file for complete search history.

(56) References Cited

U.S. PATENT DOCUMENTS

| | | | | |
|---|---|---|---|---|
| 9,305,170 | B1* | 4/2016 | Gauvin | G06F 21/60 |
| 2009/0254572 | A1* | 10/2009 | Redlich | G06Q 10/06 |
| 2013/0124244 | A1* | 5/2013 | Johnson | G06Q 10/0631 |
| | | | | 705/7.12 |
| 2014/0365579 | A1* | 12/2014 | Thrasybule | H04L 67/26 |
| | | | | 709/205 |
| 2015/0177921 | A1* | 6/2015 | Duggal | G06F 3/04817 |
| | | | | 715/747 |
| 2017/0083290 | A1* | 3/2017 | Bharthulwar | G06F 8/20 |
| 2018/0181552 | A1* | 6/2018 | Konnola | G06F 17/24 |

* cited by examiner

*Primary Examiner* — Aravind K Moorthy
(74) *Attorney, Agent, or Firm* — SBMC

(57) ABSTRACT

Techniques for creating and managing chattels to control design asset behaviors are described. A behavior is assigned by a digital content creation system to design asset data. The behavior can indicate how the design asset data will respond in different conditions. Then, access level data is generated that identifies different user types and how the behavior of the design asset data is modifiable by the different user types. The digital content creation system subsequently generates chattel data that includes the behavior, the access level data, and a visual form of the design asset data and outputs the chattel data. The chattel data may be output to a centralized storage location, such as a cloud storage location, that allows other users to access the chattel data. The centralized storage location provides centralized control, allowing updates to the chattel to occur at each location where the chattel appears.

20 Claims, 9 Drawing Sheets

CREATING AND MANAGING CHATTELS TO CONTROL DESIGN ASSET BEHAVIORS

BACKGROUND

Present-day design systems allow digital content creators to create a vast array of digital content. Once a digital content creator creates an individual item of digital content, or "design asset," through interaction with a computing device, the creator may wish to apply rules on how the design asset is used by others when the design asset leaves the creator's workspace. For example, the creator may allow end-designers, who utilize the creator's design asset within another instance of content of a computing device, to use a design asset to create a web page or publication. The creator may provide the end-designers with rules on how the design asset can be used in written usage guidelines or communicate the rules verbally in iterative sessions with the end-designers. However, these rules are not attached to the design asset itself, and therefore are easily broken by the end-designers that interact with conventional systems. This also forces the creator to constantly monitor every use of the design asset to determine whether the end-designers, or others, are breaking the rules for the design asset. This is a truly insurmountable task for creators that interact with conventional systems who wish to spend time creating these assets, rather than scouring the Internet and printed publications for illegitimate uses of the design assets after creation.

In addition to the challenges noted above that creators have with implementing rules for their design assets, additional problems exist when creating and updating design assets. For example, when a creator creates a design asset, the creator may also create variations on the design asset to use in different contexts, such as with color, shading, or animations, to name some examples. However, it is difficult for a creator to foresee every context in which a design asset may be used, and therefore these variations often do not satisfy the needs of end-designers that wish to utilize the design asset. Furthermore, variations of the design asset may go unused and waste storage space and the creator's time by creating these unused variations. Finally, if the creator wants to update a design asset, it is a tedious task to update the design asset in each place that the design asset has been used. Consequently, conventional design asset creation systems are wrought with redundancies, shortcomings, and lack of control over a creator's digital content.

SUMMARY

Techniques for creating and managing a package of information are described that allow a design asset to respond to an environment, interactions, and data that the design asset may encounter in accordance with rules set by a creator, referred to herein as a "chattel." Chattels control design asset behaviors from a central location using rules that coordinate behaviors of the design asset with access levels for different user types. In this way, an ecosystem of smarter design assets is created, including better workflows between creators, end-designers, and end-users. Further, chattels can limit modifications made by end-designers to permitted modifications, and perform updates to design assets wherever design assets may appear, automatically and without additional user intervention.

In one example, a script that describes a behavior is assigned by a digital content creation system as part of design asset data. The behavior indicates how the design asset data responds to an action in different conditions in which the design asset data is to be executed. The action includes operations performed on the design asset data by an environment that incorporates the design asset data, interactions (e.g., user interactions) performed on the design asset data, and data linked to the design asset data. The digital content creation system also generates access level data that identifies different user types and how and which design asset data is permitted to be modified by the behavior by the different user types. For example, the digital content creation system may generate access level data that allows one user type to change a color of the design asset to one of a limited number of colors. For another user type, the access level data may indicate that a second user type is not allowed to change any color of the design asset whatsoever. The digital content creation system subsequently generates chattel data that includes the behavior, the access level data, and a visual form of the design asset data and outputs the chattel data. The chattel data may be output to a centralized storage location, such as a cloud storage location, that allows other users to access the chattel data, e.g., as part of a subscription-based service. As a result, the chattel data may represent a complete package of design asset variations that are permitted by a creator of the design asset.

In another example, a digital content creation system accesses an instance of a chattel that includes a visual form of design asset data, along with rules and behaviors assigned to the design asset data. The rules and behaviors can be based on access level data that corresponds to a user type of a user who desires access to the instance of the chattel. The instance of the chattel may only include the visual forms that the user type has been granted access to, and behaviors that control how the visual forms can be manipulated by the particular user type, but not the original chattel itself. After the chattel is accessed, the digital content creation system modifies the instance of the chattel, while restricting modification of the instance of the chattel according to the rules based on the user type as defined by the access level data. The digital content creation system can then control an end-designer's access to certain behaviors of the chattel to change certain attributes of the design asset. However, the digital content creation system in this example does not permanently alter the original chattel or design asset at its central location.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
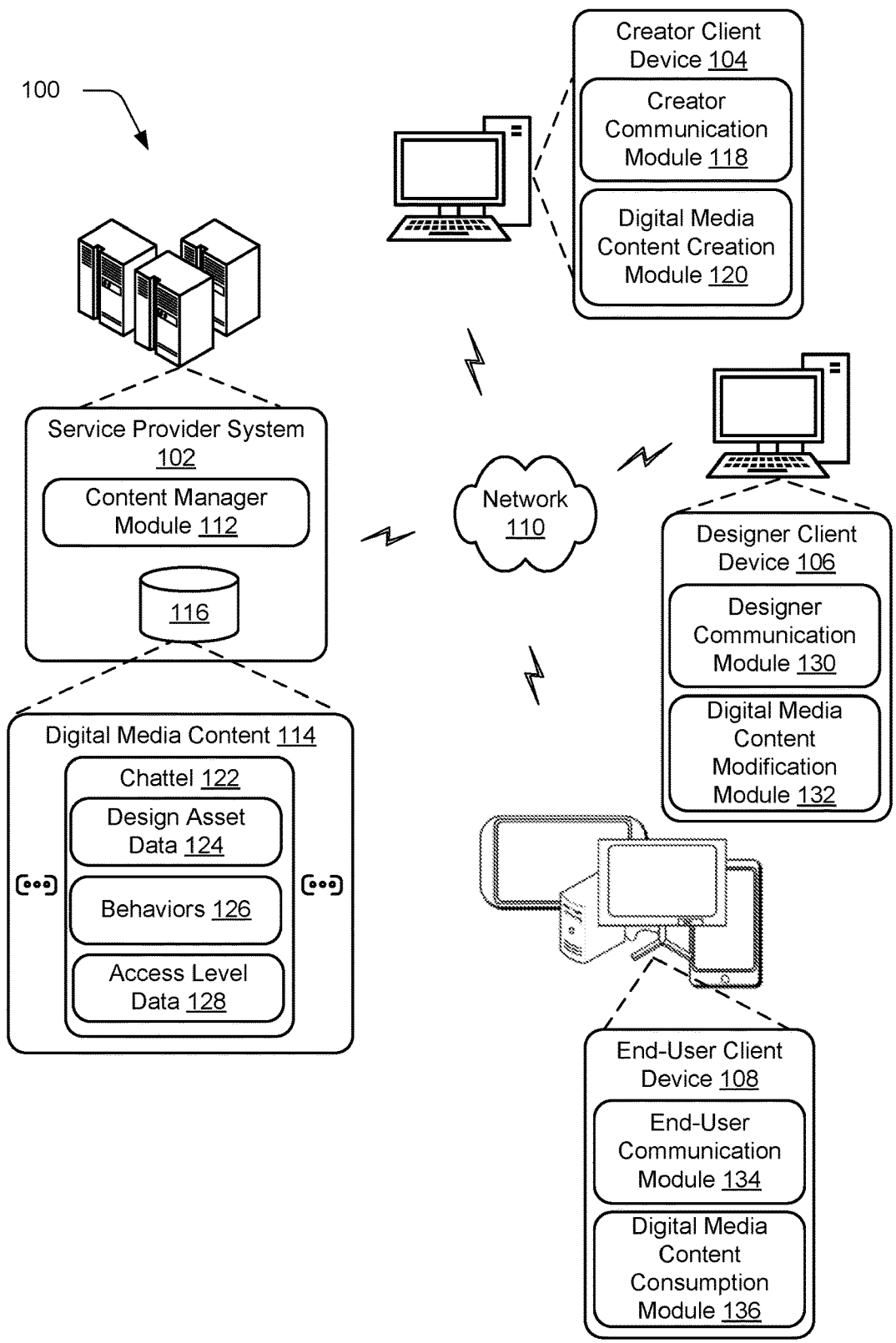
FIG. 1 is an illustration of an environment in an example implementation that is operable to employ chattel creation and management techniques described herein.

Digital content creation systems give content creators limitless options for creating digital design assets. Conventional digital content creation systems, however, involve numerous redundancies and shortcomings in instances in which creators create variations of a design asset (e.g., for use in different scenarios), and these systems further lack control over the creator's design asset once it is released or published. For example, the creator may want different variations of a design asset for display on a mobile device and a desktop computer, or may want variations of a design asset available for use with different background colors. However, a creator is typically not able to foresee every potential scenario in which the design asset may be used, and end-designers are often left without creator-approved variations available for use. On the other hand, the creator may expend a great amount of time and effort to create numerous variations for use by end-designers, only to have the variations sit unused because the thought-out scenarios were never implemented.

Once a design asset is created and distributed, it is also nearly impossible to make any necessary updates using conventional techniques to the design asset in each place that the design asset has been utilized or published. This is because the design asset, once distributed, is no longer tied to the original in conventional techniques. Therefore, to make any updates to the design asset, the creator first attempts to locate each use of the design asset, and then manually make changes at each location where the design asset is published. Otherwise, outdated versions of the design asset may continue to circulate indefinitely. Locating and updating the design asset after it has been distributed is exceedingly time consuming and wasteful for content creators.

Additionally, after the design asset is created and distributed, creators that utilize conventional techniques and systems have little to no control of how the design asset is used or altered by end-designers or other users. The most common current techniques for controlling how a design asset is used involve either publishing usage guidelines within a document that is distributed, separately from the design asset, to end-designers. The usage guidelines may also be communicated verbally to the end-designers. With these conventional techniques, there is no way to ensure that the end-designers adhere to the usage guidelines, or any way for the creator to be notified if the end-designers break rules outlined in the usage guidelines. Consequently, end-designers have no apprehension about breaking these usage guidelines. Combined with the challenges noted above regarding the inability for a creator to create variations for every possible usage scenario, it is easier for end-designers to simply disregard the usage guidelines and manipulate a design asset to fit their needs. This can lead to any number of unapproved and illegitimate copies and manipulations of the design asset that the creator of the design asset has no control over.

Accordingly, techniques and systems are described for creating and managing a package of information that allows a design asset to respond to an environment, interactions, and data that the design asset may encounter in accordance with rules set by a creator, referred to herein as a "chattel." Chattels define design asset behaviors in a digital content creation system with access level data included in the chattel that identifies different user types and how the design asset is modifiable by the behaviors by the different user types. The digital content creation system, for instance, may be configured to allow creation and editing of digital content as part of an application of a computing device, as an online application (e.g., via subscription-based access), provide opportunities to purchase a good or service, online storage, or other web service that is accessible via a network.

Digital content is any content that may be stored digitally or electronically, e.g., movies, books, documents, games, applications, images, audio files, and so on. Digital content may also comprise an application, web service, and so forth and thus different interactions with the digital content (e.g., a user interface of the digital content) also correspond to different actions, e.g., selection of a link, an item in a user interface, and so forth. A design asset, as referred to herein, is a single item of digital content that can be created or modified in a digital content creation system.

In order to provide a better understanding of creating and managing chattels to control design asset behaviors, consider the following example as described from the perspective of a content creator. The creator has created a design asset within the digital content creation system that includes a new logo for the creator's business. The creator wants to publish the logo in numerous formats—standard desktop computer webpage, mobile webpage, television commercial, online advertisement, print advertisement, screen printed on clothing, incorporated onto the creator's business product, and so forth. As is readily apparent, many of these publication avenues require the creator to relinquish some control of the design asset so that the design asset can be published in the corresponding medium. For example, the creator will likely transfer a form of the design asset to an advertising agency to create an online advertisement, to a screen printing company to create the clothing that incorporates the design asset, and so on. These entities that utilize the creator's design asset within another instance of content are referred to as "end-designers."

The creator may assign, via interaction with a user interface of a digital content creation system, a behavior to design asset data of the design asset. The behavior can take the form of a script indicating how the design asset data responds to an action in different conditions in which the design asset data is to be executed. The action may be from an interaction (e.g., user input), an environment, or data that may affect one or more aspects the chattel. For example, the creator may specify a behavior to the design asset that does not allow an end-designer to resize the design asset smaller than a certain size. In another example, the creator may specify a behavior that causes a color of the design asset appearing on a webpage to change in response to an item of linked data changing.

After assigning a behavior to the design asset data, a computing device of the digital content creation system generates access level data that identifies different user types and how the behavior of the design asset data is modifiable by the different user types. For example, the access level data may include one or multiple user types associated with the end-designers described above. In this example, the creator may want the screen printer to have greater control over colors in the design asset when the logo of the design asset is printed on clothing, and therefore the screen printer is assigned its own user type. The creator may then want the online end-designers to have greater control over sizing of the design asset for publication in different online advertisements, web pages, and so forth, and therefore the online end-designers are assigned to a different user type. The creator may also want to allow end-users, or users who consume the digital content created by the end-designers, to have their own limited constraints on how the design asset is modified, and thus can create yet another user type.

The computing device of the digital content creation system then generates chattel data that includes the behavior, the access level data, and a visual form of the design asset data, and then outputs the chattel data. The chattel data is a package of information that allows the design asset to respond to an environment, interactions, and data that the design asset may encounter in accordance with rules set by the creator. The environment includes conditions in which the chattel will be used, such as a platform that the chattel is used in (i.e., design software like Adobe Photoshop™ or Adobe Illustrator™, a web browser, mobile applications, or virtual reality), the medium the chattel is used for (i.e., to make a poster, to make a responsive webpage, or an icon as part of another item of digital content), and the context in which the chattel appears (i.e., the design asset's background, nearby objects, and other chattels incorporated into the item of digital content). Interactions include any form of input received by the chattel from a human user or a computing device, such as a touch input, voice input, a gesture, and so forth. Data is any form of linked dynamic metric that can change according to external parameters, such as time of day, population of a city, or result of a sporting event.

When the chattel is output, the digital content creation system can specify that user interaction with the chattel is limited to an instance of the chattel rather than the chattel data itself. This allows the end-designers to make permissible modifications to the instance of the chattel, which can then be saved in a central location such that the creator maintains control over all of the versions of the design asset. When end-designers access an instance of a chattel, the end-designer's digital content creation system temporarily accesses visual forms of the design asset and behaviors that have been assigned to the design asset based on the user type of the particular end-designer. The instance of the chattel recognizes the environment, interactions, and data in the end-designer's digital content creation system and responds according to the rules implemented by the creator.

The end-designer can modify the instance of the chattel based on inputs provided to a computing device by the end-designer, but the digital content creation system restricts modifications to the instance of the chattel according to the rules based on the user type defined by the access level data. In this way, end-designers are free to modify a design asset within the constraints set by the creator through interaction with a computing device, and the creator has complete access to all modifications that are made to their original design asset. Further, because each instance of the chattel is linked to the original chattel data, updates to the design asset by the creator are instantaneous and are applied to every location where the design asset appears.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques for creating and managing chattels to control design asset behaviors as described herein. The illustrated environment 100 includes a service provider system 102, a creator client device 104, a designer client device 106, and an end-user client device 108 that are communicatively coupled, one to another, via a network 110. Computing devices that implement the service provider system 102 and the client devices 104, 106, and 108 may be configured in a variety of ways.

A computing device, for instance, may be configured as a desktop computer, a laptop computer, a mobile device (e.g., assuming a handheld configuration such as a tablet or mobile phone), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is shown in some examples, the computing device may be representative of a plurality of different devices, such as multiple servers utilized by a business to perform operations "over the cloud" as shown for the service provider system 102, and as further described in FIG. 9.

The service provider system 102 is illustrated as including a content manager module 112 that is implemented at least partially in hardware of a computing device. The content manager module 112 is configured to manage online interaction via the network 110 of the client devices 104, 106, and 108 with digital media content 114, which is stored in storage 116 of the service provider system 102. As previously described, the digital media content 114 may take a variety of forms, such as an online application, online storage, web service, digital images, digital audio, multimedia, and so forth. Thus, content interaction data 118 communicated via the network 110 involving interaction with the digital media content 114 by the client devices 104, 106, and 108 via the network 110 may also take a variety of forms, such as selection of a menu item, voice command, gesture, selection of a hyperlink, and so forth.

A user of the creator client device 104, for instance, may create the digital media content 114 by accessing the content manager module 112 via the network 110, such as to create an illustration, movie, audio data, and so forth. This may include execution of applications locally by the creator client device 104 and remotely by the service provider system 102 that both involve actions taken with respect to the digital media content 114. As part of this, a user of the creator client device 104 may initiate operations involving interaction with the digital media content 114, such as to draw a line, color a shape, enter text, and so forth. Thus, initiation of these operations is considered performance of an action involving interaction with the digital media content 114. Other examples are also contemplated in which the digital media content 114 is an application, web service, and so forth and thus different interactions with the digital media content 114 (e.g., a user interface of the digital media content 114) also correspond to different actions, e.g., selection of a link, an item in a user interface, and so forth.

The creator client device 104 is shown as including a creator communication module 118 that enables the creator client device 104 to interact with the digital media content 114 of the service provider system 102 via the network 110. The creator client device 104 also includes a digital media content creation module 120, which provides functionality for creating digital media content as described above and below. Creation of digital media content by the digital media content creation module 120 may include creation of design assets, along with assigning behaviors and access levels that are dependent upon a user type to the design assets. The digital media content creation module 120 can further package the design asset with the behaviors and access levels into a chattel which links these elements together when the chattel is output.

The creator communication module 118 transmits data regarding the chattel to the storage 116 of the service provider system 102. The chattel 122 itself is stored in the storage 116 of the service provider system 102, and includes design asset data 124, behaviors 126, and access level data 128. The design asset data 124 includes one or more visual and/or auditory forms of the design asset, and any variations of the visual or auditory forms of the design asset, created by the creator. For example, the design asset data 124 can include an image, an animation, a sound bite, a video clip, a drawing, and so on.

The behaviors 126 include responses to actions set by the creator for different conditions in which the design asset data 124 is used. The behaviors 126 may take the form of scripts that instruct how the design asset data 124 responds to actions in different conditions when executed by respective computing device. For example, the behaviors can include how the design asset will appear on different display devices, how the design asset will respond when a browser is resized, how the design asset can link to additional data, and so forth. The access level data 128 includes data relating to how different user types can access or change an element of the design asset data 124 and/or one of the behaviors 126. For example, the access level data 128 can include data indicating that one user type is permitted to change the design asset data 124 to have a holiday theme when displayed on a website, while another user type is only permitted to view the design asset data.

Similar to the creator client device 104 described above, a user of the designer client device 106 may create the digital media content 114 by accessing the content manager module 112 via the network 110, such as to create an illustration, movie, audio data, and so forth. This may include execution of applications locally by the designer client device 106 and remotely by the service provider system 102 that both involve actions taken with respect to the digital media content 114. As part of this, a user of the designer client device 106 may initiate operations involving interaction with the digital media content 114, such as to draw a line, color a shape, enter text, and so forth. Thus, initiation of these operations is considered performance of an action involving interaction with the digital media content 114. Other examples are also contemplated in which the digital media content 114 is an application, web service, and so forth and thus different interactions with the digital media content 114 (e.g., a user interface of the digital media content 114) also correspond to different actions, e.g., selection of a link, an item in a user interface, and so forth. Additional details regarding the digital media content creation module 120 and the creator communication module 118 are described in the following discussion and are shown in a corresponding figure.

The designer client device 106 is shown as including a designer communication module 130 that enables the designer client device 106 to interact with the digital media content 114 of the service provider system 102 via the network 110. The designer client device 106 also includes a digital media content modification module 132, which provides functionality for creating and editing digital media content as described above and below. In this case, the designer communication module 130 accesses an instance of the chattel 122 located in the storage 116 of the service provider system 102 via network 110, such as by selection of a hyperlink that represents the chattel 122. Based on a user type assigned to the user of the designer client device 106, the instance of the chattel 122 permits the user to perform actions to the design asset data 124 and/or behaviors 126 in accordance with the access level data 128.

In implementations, download is limited (at least temporarily) at the designer client device 106 to the permitted visual or auditory forms of the design asset 124, and the permitted behaviors 126, indicated by the access level data 128. This allows the user of the designer client device 106 to manipulate the design asset data 124 within the constraints identified in the access level data 128. However, any modifications made to the design asset data 124 or the behaviors 126 by the user of the designer client device 106 refer to the chattel 122 stored in the storage 116 of the service provider system 102, rather than creating a new copy of the design asset at the designer client device. Modifications made to the design asset data 124 or the behaviors 126 by the user of the designer client device 106 are communicated to the service provider system 102 by the designer communication module 130 via the network 110. This allows central control by the original creator of the chattel 122 without allowing unauthorized copies to be created. Additional details regarding the digital media content modification module 132 and the designer communication module 130 are described in the following discussion and are shown in a corresponding figure.

A user of the end-user client device 108 may consume the digital media content 114 by accessing the content manager module 112 via the network 110, such as to access an illustration, movie, audio data, and so forth. This may include execution of applications locally by the end-user client device 108 and remotely by the service provider system 102 that both involve actions taken with respect to the digital media content 114. As part of this, a user of the end-user client device 108 may initiate operations involving interaction with the digital media content 114, such as to view an image or drawing, listen to audio, enter text, and so forth. Thus, initiation of these operations is considered performance of an action involving interaction with the digital media content 114. Other examples are also contemplated in which the digital media content 114 is an application, web service, and so forth and thus different interactions with the digital media content 114 (e.g., a user interface of the digital media content 114) also correspond to different actions, e.g., selection of a link, an item in a user interface, and so forth.

The end-user client device 108 is shown as including an end-user communication module 134 that enables the end-user client device 108 to interact with the digital media content 114 of the service provider system 102 via the network 110. The end-user client device 108 also includes a digital media content consumption module 138, which provides functionality for consuming digital media content as described above and below. In this case, the end-user communication module 134 accesses an instance of the chattel 122 located in the storage 116 of the service provider system 102 via network 110, such as by selection of a hyperlink that represents an item of media content that includes the chattel 122. Based on a user type assigned to the user of the end-user client device 108, the instance of the chattel 122 permits the user to perform actions to the design asset data 124 and/or the behaviors 126 in accordance with the access level data 128.

In implementations, download is limited to the permitted visual or auditory forms of the design asset 124, and the permitted behaviors 126, indicated by the access level data 128 by the end-user client device 108. This allows the user of the end-user client device 108 to manipulate the design asset data 124 within the constraints identified in the access level data 128. Unlike the designer client device 106, however, the access level data 128 may indicate a subset of modifications to be performed by a user of the end-user client device 108. For example, a user of the designer client device 106 may be permitted to change colors, shapes, or other attributes of the design asset data 124 based on the access level data 128 using the digital media content modification module 132. On the other hand, a user of the end-user client device 108 is limited to resizing the design asset data 124 as a browser window is resized or muting audio of the design asset data using the digital media content consumption module 136.

Figure 2:
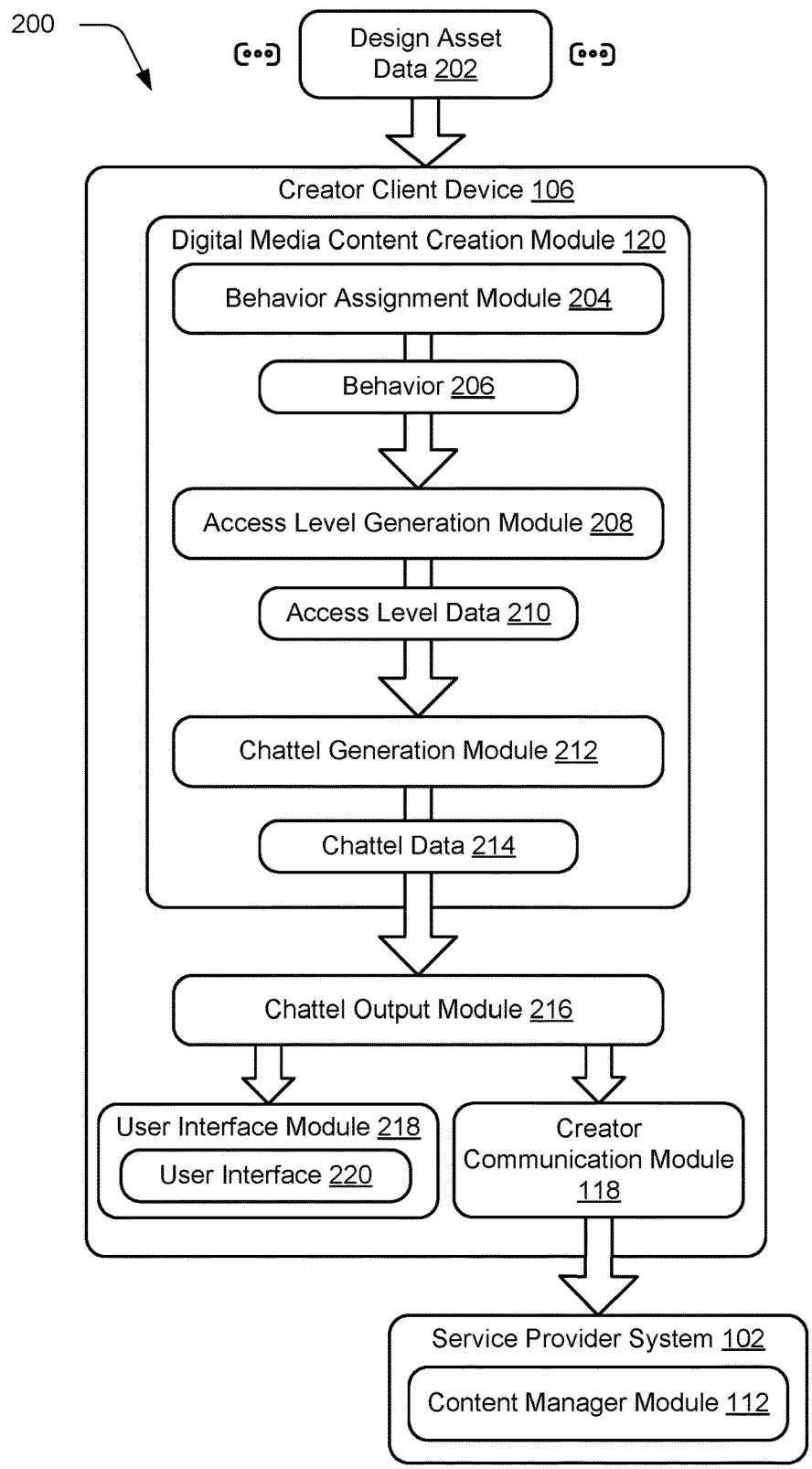
FIG. 2 depicts a system in an example implementation showing operation of a digital media content creation module of FIG. 1 in greater detail.

FIG. 2 depicts a system 200 in an example implementation showing operation of the digital media content creation module 120 of FIG. 1 in greater detail. To begin in this example, design asset data 202 is received by digital content creation module 120. A creator using the creator client device 104, for instance, may interact with a user interface of the creator client device 104. The user interface is configured to support a digital content creation and editing workspace in which a creator may interact with digital media content 114 stored in the storage 116 by the service provider system 102. The digital content creation and editing workspace may include functionality found in applications such as Adobe Illustrator™, Adobe Photoshop™, Adobe Audition™, or Adobe InDesign™ including creating and editing digital drawings, image editing, video editing, sound editing, animation creating and editing, and so forth. In interacting with the user interface of the creator client device 104, the creator may create, edit, access, or modify the design asset data 202 in the digital content creation and editing workspace. The design asset data 202 can also include any variations of a design asset, such as visual or auditory variations of the design asset.

The digital media content creation module 120 accesses the design asset data 202, and a behavior assignment module 204 of the creator client device 104 assigns a behavior 206 to the design asset data 202. The behavior 206 may take the form of one or more scripts that instruct how the design asset data 202 responds to actions in different conditions as part of execution by a computing device. Behaviors can include, for example, changing a color of the design asset when the design asset appears on a different colored background, causing the design asset to "pop-up" when clicked on by a user, determining how the design asset is resized when a browser displaying the design asset is resized, and so forth.

A behavior 206 may be assigned to the design asset data 202 through one or more interactions with the user interface, such as selection from a drop-down menu, selection of a button or icon, input of text, input of a numeric value, a gesture input, and so on. Alternatively or additionally, a creator using the client computing device 106 may employ another software developer to design custom behaviors that are not available in the content creation and editing workspace and upload the custom behaviors to the service provider system 102. The creator can then access the custom behaviors and assign the custom behaviors to the design asset data as desired, such as by accessing the service provider system 102 via the network 110.

After the behavior 206 is assigned to the design asset data 202, an access level generation module 208 of the creator client device 104 generates access level data 210 for the design asset data 202 and the behavior 206. The asset level data 210 indicates user types that have different permissions to access, manipulate, or modify the design asset data 202 based on the assigned behavior 206. Generally, user types indicated in the access level data 210 may include end-designers and end-users, although additional categories of user types are considered, including sub-categories of end-designers and end-users that are associated with different access level data 210. End-designers are represented by those who utilize the creator's design asset when creating another instance of content, such as by including the design asset in a webpage, advertisement, print media, and so on. End-users can be represented by users who consume the digital content created by the end-designers, or those who consume the design asset directly from the creator, but are otherwise users for whom the digital content is created and are not considered part of the workflow the creation of the digital content.

The access level generation module 208 allows a creator using the creator client device 104 to determine which user types will have access to the behavior 206. For example, the creator can assign a behavior 206 as a range of colors that the design asset can be changed to. Then, the creator can indicate in the access level data 210 that end-designers are permitted to utilize the behavior to change a color of the design asset to a color in the range of colors. The creator can also indicate in the access level data 210 that end-users are not permitted to change a color of the design asset data by prohibiting access to the behavior 206 for the end-user user type. The access level generation module 208 can generate the access level data 210 in response to an input in the user interface, such as selection of an icon or in a drop-down menu. Alternatively or additionally, the access level generation module 208 can generate the access level data 210 using a default setting of "end-designer" or "end-user" for a behavior 206 automatically responsive to the behavior being assigned to the design asset data 202.

When the design asset data 202 has been assigned a behavior 206 and access level data 210 has been generated, a chattel generation module 212 of the creator client device 104 generates chattel data 214. The chattel data 214 is a package of information that includes the design asset data 202 including any variations, the behavior 206, and the access level data 210. The chattel generation module 212 links the chattel data 214 such that the design asset data 202 responds to different conditions in accordance with the creator's intentions wherever the design asset is presented.

The chattel data 214 may be leveraged in a variety of ways, such as in the creation of composite items of digital media content, sharing with end-designers, presenting to end-users, and so forth. The chattel data 214 may be received and distributed automatically by a chattel output module 216, which can output the chattel data 214 to a user interface module 218. The user interface module 218 outputs the chattel data 214 in a user interface 220 of the creator client device 104 such that the creator using the creator client device can update, modify, or add to any aspect of the chattel data. The user interface 220, for instance, can include elements that allow the creator to update or modify the design asset data 202 including variations of the design asset data, the behavior 206, and/or the access level data 210 as the creator creates the complete chattel.

The chattel data 214 may also be distributed automatically by the chattel output module 216 to the creator communication module 118. The creator communication module 118 can further output the chattel data 214 to the content manager module 112 of the service provider system 102. For example, the creator may select, using the user interface 220, to have a current version of the chattel data 214 output to the content manager module 112 of the service provider system 102. Then, the content manager module 112 may allow end-designers and end-users to access the chattel data 214 and use the chattel according to their respective access levels.

Figure 3:
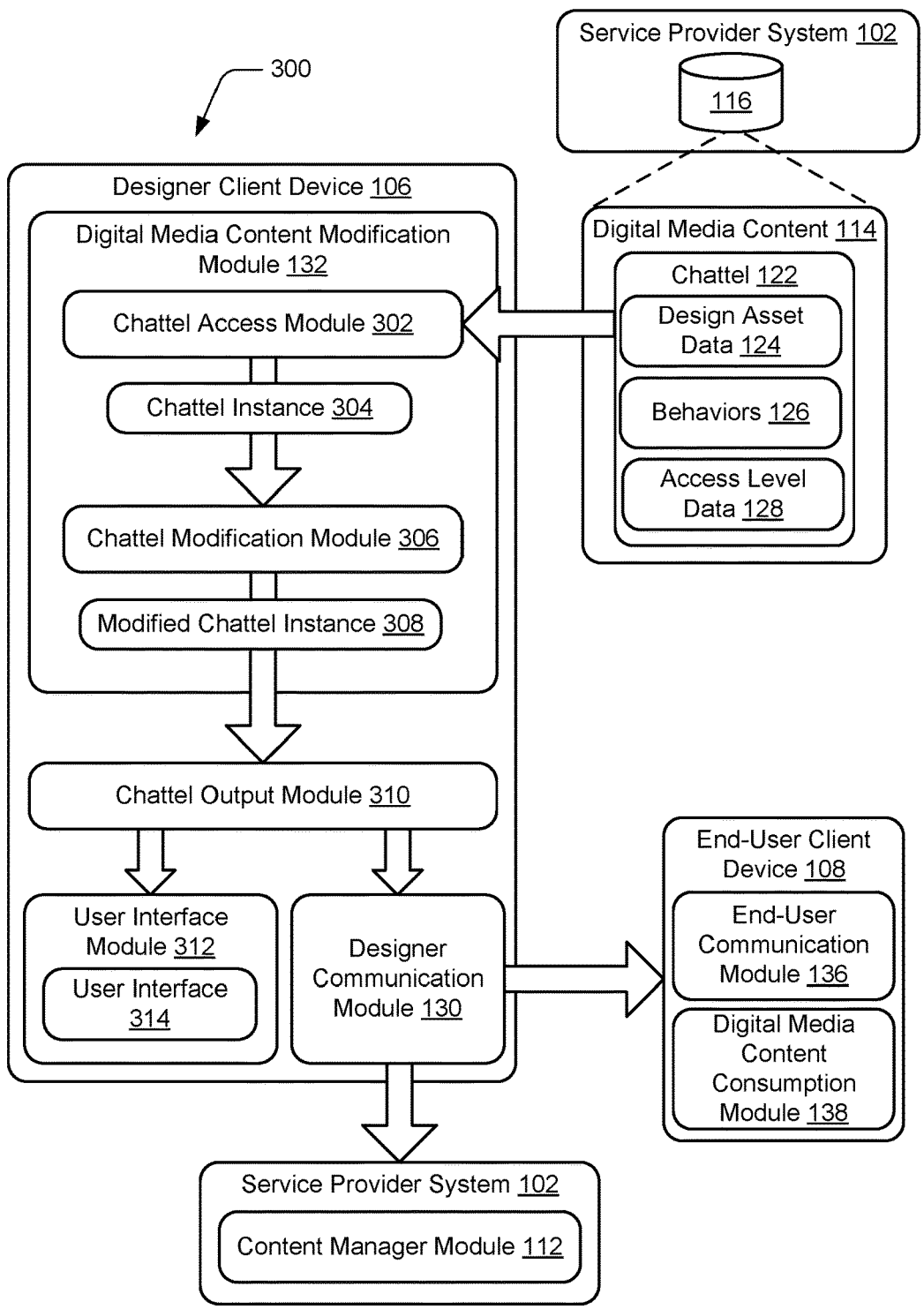
FIG. 3 depicts a system in an example implementation showing operation of a digital media content modification module of FIG. 1 in greater detail.

FIG. 3 depicts a system 300 in an example implementation showing operation of the digital media content modification module 132 of FIG. 1 in greater detail. To begin this example, a chattel access module 302 of the digital media content modification module 132 receives a request from an end-designer to access a chattel 122 located in the storage 116 of the service provider system 102. In this example, the digital media content 114 within storage 116 may contain a library of chattels that users can access and select individual chattels from the library to view and modify according to access levels of the users. The library of chattels may include functionality found in applications such as Adobe Stock™ and Adobe CC™, for instance.

An end-designer using the designer client device 106, for instance, may interact with a user interface of the designer client device 106. The user interface is configured to support a digital content creation and editing workspace in which the end-designer may interact with digital media content 114, and can be similar to that of the creator client device 104. The digital content creation and editing workspace may include functionality found in applications such as Adobe Illustrator™, Adobe Photoshop™, Adobe Audition™, or Adobe InDesign™, including creating and editing digital drawings, image editing, video editing, sound editing, animation creating and editing, and so forth. In interacting with the user interface of the designer client device 106, the end-designer may access, edit, or modify a design asset according to the behaviors and the access level data included in the chattel in the digital content creation and editing workspace.

In response to the request to access the chattel 122 by the end-designer, the chattel access module 302 access a chattel instance 304 of the chattel 122, thus bringing the chattel instance into the end-designer's digital content creation and editing workspace. The chattel instance 304 does not fully download the chattel 122 onto the designer client device 106. Rather, only specified design asset data 124, such as permitted visual and/or auditory forms, and behaviors 126, such as scripts that describe how the design asset data behaves in certain conditions, are temporarily downloaded onto the designer client device 106. The specified design asset data 124 and behaviors 126 that are temporarily downloaded to the designer client device 106 in the chattel instance 304 are based on indications the access level data 128 and the access level of the end-designer using the designer client device. In other words, the end-designer has a designated access level based on the end-designer's user type. The chattel instance 304 includes specified design asset data 124 and behaviors 126 that correspond to the access level of the end-designer, allowing the end-designer to only access permitted design asset data and behaviors for the end-designer's user type, and not the entire chattel 122.

When the chattel instance 304 is in the end-designer's digital content creation and editing workspace, a chattel modification module 306 allows the end-designer to modify the design asset data 124 based on the behaviors 126 and the indications in the access level data 128. The end-designer can access certain behaviors 126 that are permitted by the access level data 128 for the end-designer's user type and make changes to attributes of the design asset data 124. However, the chattel modification module 306 does not allow the end-designer to make any changes to the chattel instance 304 that are not permitted by the access level data 128.

In an example, the end-designer may change a creation art board of the digital content creation and editing workspace from a desktop layout to a mobile layout. When the end-designer changes the creation art board, the chattel modification module 306 can alter accessible behaviors 126 that are available to the end-designer based on the access level data 128 for mobile layouts. This may include disabling responsive size behaviors for the design asset when the end-designer is working with the chattel instance 304 on the creation art board in the mobile layout. The creator of the chattel 122 may disable the responsive size behaviors when an end-designer moves to the mobile layout because it is uncommon for interface sizes to change at an end-user's mobile device. Therefore the end-designer should not need to change the responsive size behaviors preset by the creator when the end-designer creates digital content for mobile containing the design asset. However, the end-designer may still have access to behaviors to change colors or visual effects of the design asset when working on the mobile layout in the creation art board, as indicated by the access level data 128.

After making modifications to the chattel instance 304, the chattel modification module 306 generates a modified chattel instance 308 that includes modifications to the design asset data 124. The modifications to the chattel instance 304 may include responses to user inputs from the end-designer to generate the modified chattel instance 308. The modified chattel instance 308 is then received and distributed automatically by a chattel output module 310, which can output the modified chattel instance 308 to a user interface module 312. The user interface module 312 outputs the modified chattel instance 308 in a user interface 314 of the designer client device 106 such that the end-designer using the designer client device can further update, modify, or add to aspects of the chattel instance 304 according to the access level data 128 and the user type of the end-designer. The user interface 314, for instance, can include elements that allow the end-designer to update or modify the chattel instance 304, or other aspects of digital content besides the chattel instance, as the end-designer completes their design.

The modified chattel instance 308 may also be distributed automatically by the chattel output module 310 to the designer communication module 130. The designer communication module 130 can further output the modified chattel instance 308 to the content manager module 112 of the service provider system 102. For example, the modifications included in the modified chattel instance 308 can be automatically communicated to the content manager module 112 to be included in the chattel 122 within the library of chattels, and thus be accessible by other end-designers and users. The designer communication module 130 communicates the modified chattel instance 308 to the service provider system 102 rather than storing the modified chattel instance at the designer client device 106. Communicating the modified chattel instance 304 to the service provider system 102 without saving the modified chattel instance to the designer client device 106 prevents unauthorized copies of the design asset from being disseminated without the original creator's permission.

Additionally, the modified chattel instance 308 may be distributed automatically by the designer communication module 130 to an end-user client device 108. The modified chattel instance 308 may be included in the distribution to the end-user client device 108 as part of a collective grouping of digital content items, such as a web page, advertisement, application, or the like. The collective grouping of digital content items may include the modified chattel instance 308 along with other chattels or design assets and presented in a manner in which an end-user cannot discern aspects that were created by the creator of the chattel 122 from aspects that were created by the end-designer.

In an example, the end-user client device 108 may receive a web page that includes the modified chattel instance 308 as a design asset within the web page at the end-user communication module 136. The digital media content consumption module 138 can then display the web page, such as within a browser of the end-user client device 108. An end-user can then perform actions on the modified chattel instance 308 within the web page based on a user type of the end-user and the access level data 128. Even though the digital media content consumption module 138 is accessing the modified chattel instance 308 as part of the web page, the modified chattel instance still references the original chattel 122 instead of a copy of the design asset created by the end-designer. This allows the original creator to restrict the behaviors 126 that are accessible to the end-user even further than the restrictions on the behaviors for the end-designer, without having to directly monitor every time that the end-designer outputs the design asset.

Continuing with the above example, the end-user may have access to limited behaviors to modify the design asset, such as to resize the design asset when the web page in the browser is resized. On the other hand, the creator may not provide end-users with any access to the behaviors 126 to modify the design asset data 124.

Figure 4:
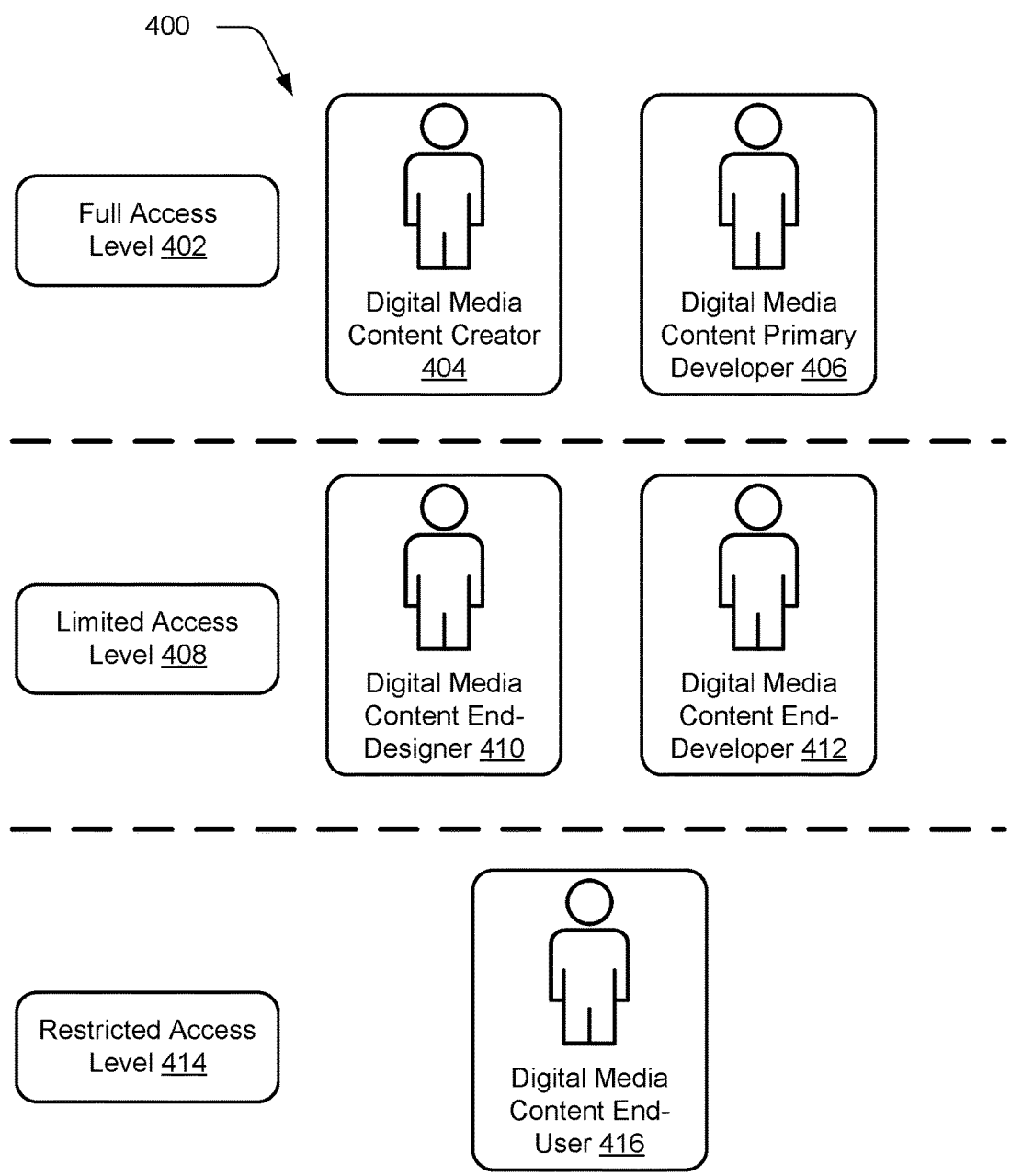
FIG. 4 depicts an example hierarchy and types of users which may be implemented by the chattel creation and management techniques described herein.

FIG. 4 depicts examples of different access levels generally at 400, which may be used in an example implementation for creating and managing chattels to control design asset behaviors. A creator of a design asset can assign the access levels to different behaviors of the design asset, allowing user types corresponding to the different access levels to have access to different behaviors. Information associated with the different access levels, such as which access levels have access to a particular behavior, can be incorporated into a chattel along with the design asset and behaviors assigned to the design asset. The information associated with the different access levels can be included in the chattel as metadata, for example.

The access levels can include, for example, a full access level 402 which permits access to all aspects included in a chattel. User types that are assigned to the full access level 402 can edit, update, or modify any component of the chattel, including the design asset itself, any behaviors associated with the design asset, and any additional access levels included in the chattel. The user types that are assigned to the full access level 402 can also add new behaviors to the design asset, and can create new access levels that designate user types for the behaviors assigned to the design asset.

In this example, the full access level 402 includes a digital media content creator 404 and a digital media content primary developer 406. The digital media content creator 404 creates a visual or auditory form of a design asset, defines interactions that the design asset may encompass, and determines whether data is to be linked to the design asset. The digital media content creator 404 can also assign behaviors to the design asset. Behaviors can include, for example, changing a color of the design asset when the design asset is placed on different backgrounds, causing the design asset to pop up when clicked, and so forth. Behaviors can be created by the digital media content creator 404 in a software that is configured to define such behaviors for design assets.

Alternatively or additionally, the digital media content creator 404 can employ the digital media content primary developer 406 to create custom behaviors. Because the digital media content primary developer 406 is a user type that is included in the full access level 402, the digital media content primary developer can update or modify all components of the chattel. Full access to everything included in the chattel allows the digital media content primary developer 406 to create custom behaviors that may not be possible to create in standard software used by the digital media content creator 404 when creating the chattel. The digital media content primary developer 406 can also upload a custom behavior to a library of behaviors that is accessible by the digital media content creator 404 or other creators or designers for use with their own design assets.

By using access levels as described herein, the digital media content creator 404 can limit access to everything included in the chattel to only a trusted primary developer. Further, the digital media content creator 404 can review all changes that are made to the chattel by the primary developer before any additional releases of the design asset. This gives the digital media content creator 404 significantly more control to reduce unauthorized uses or modifications to his or her design asset.

The access levels can also include, for example, a limited access level 408 which permits access to fewer aspects included in a chattel than the full access level 402. User types that are assigned to the limited access level 408 can edit, update, or modify select components of the chattel that have been designated by user types in the full access level 402. Editing, updating or modifying the select components can include altering visual and/or auditory attributes of the design asset based on behaviors permitted in the limited access level 408.

In this example, the limited access level 408 includes a digital media content end-designer 410 and a digital media content end-developer 412. The digital media content end-designer 410 may style and lay out pages with content including text, images, video, and animations. The digital media content end-developer 412 may assist with the creation of a page by contributing technical information, or code, that allows data to be presented within a page layout. The digital media content end-designer 410 and digital media content end-developer 412 may have access to the same behaviors or different behaviors according to designations made by the digital media content creator 404 in the access level data. For instance, the digital media content creator 404 may give the digital media content end-designer 410 access to more behaviors to manipulate colors of the design asset, and give the digital media content developer 412 access to more behaviors to link data to the design asset.

The digital media content creator 404 can further permit the user types in the limited access level 408 to combine multiple chattels together to form a composite. The composite may then be saved in a portable network graphics (.png) format, a Wavefront 3D object (.obj) format, and so forth. The composite may also then be assigned new behaviors by either the digital media content creator 404 or the digital media content end-designer 410 or developer 412, and thus the composite itself would become a chattel.

The access levels can further include, for example, a restricted access level 414. The restricted access level 414 includes a digital media content end-user 416. The digital media content end-user 416 is not involved in the creation process of the design asset or the chattel, but rather consumes the design asset either on its own or as part of other digital media. The digital media content end-user 416 interacts with the chattel like any other item of content. For instance, if the design asset appears as part of a website created by an end-designer and/or end-developer, the digital media content end-user 416 can interact with the design asset like any other item of digital content on appearing in the website.

The digital media content creator 404 may prohibit the digital media content end-user 416 to access any of the behaviors assigned to the design asset in the chattel by indicating such in access level data for the restricted access level 414. Alternatively, the digital media content creator 404 can permit the digital media content end-user 416 to access a subset of behaviors assigned to the design asset in the chattel by indicating such in the access level data for the restricted access level 414. For example, the digital media content creator 404 may permit the digital media content end-user 416 to access a behavior to control audio volume of the design asset appearing in a website.

Figure 5:
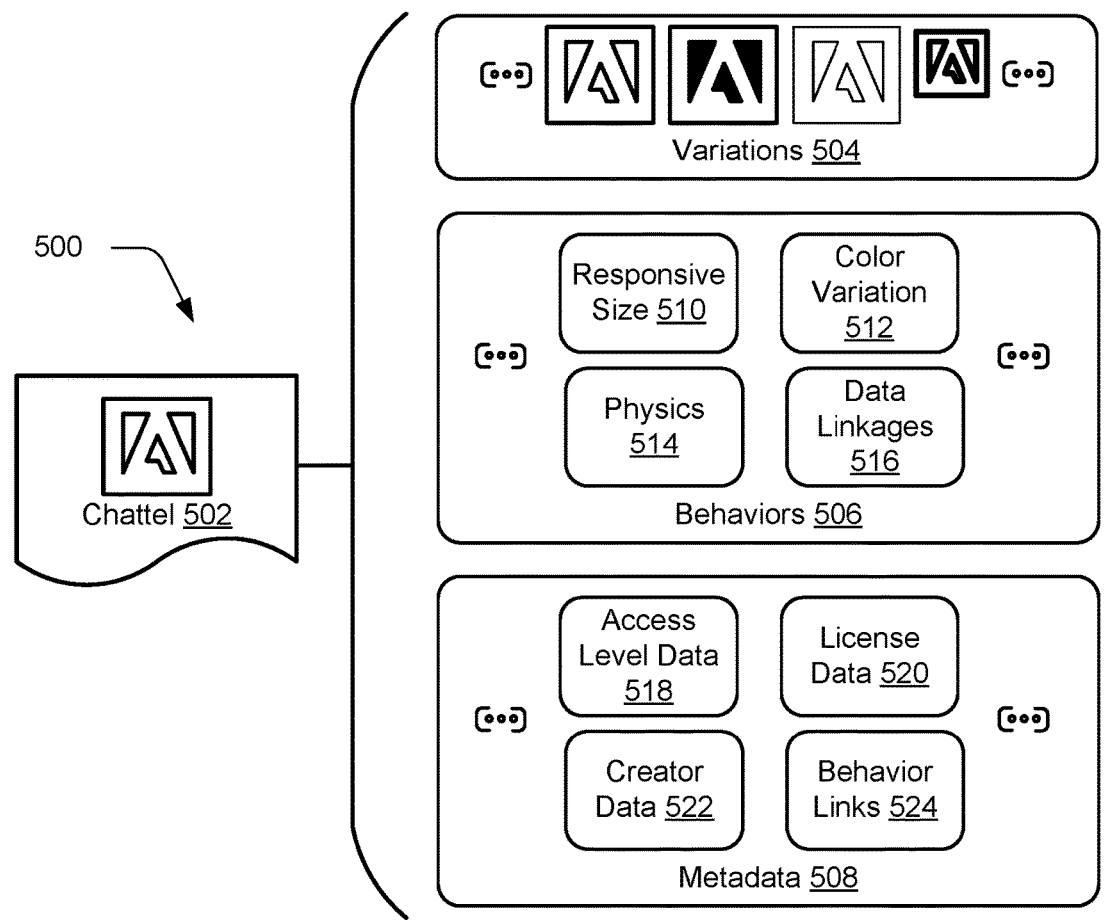
FIG. 5 illustrates an example of chattel operation during consumption in accordance with the chattel creation and management techniques described herein.

FIG. 5 depicts examples of different components that may be included in a chattel generally at 500, which may be used in an example implementation for creating and managing chattels to control design asset behaviors. As discussed herein, a chattel can be thought of as a package of information that relates to a design asset and is used to control how the design asset behaves in certain conditions.

To illustrate, a chattel 502 is depicted, which includes variations 504 of a design asset, behaviors 506 that have been assigned to the design asset, and metadata 508 that provides additional information about the design asset. The variations 504 of the design asset can include visual and/or auditory variations that are created by a creator of the design asset. Additionally, the variations 504 may include variations that are created by an end-designer. As discussed above, when an end-designer modifies attributes of a design asset, the modifications are not saved to the end-designer's client device. Instead, the modifications are linked to the chattel itself, and are saved to a central location such as service provider system 102. These modifications made by end-designers thus may be included in the variations 504, allowing the design asset to address the desires of numerous end-designers while not deviating from the original creator's intent for the design asset. The variations 504 can include variations of attributes of the design asset, such as shape, size, color, motion, sound effects, and so forth.

The behaviors 506 included in the chattel 502 are responses set by a creator of the design asset for different conditions in which the chattel may be used. Alternatively, as discussed above, the creator may employ a developer to create custom behaviors for a design asset by allowing the developer to have full access to the chattel. Each of the behaviors 506 may be applied to one or multiple variations 504 of the design asset. The behaviors 506 depicted as being included in the chattel 502 include responsive size 510, color variation 512, physics 514 of the design asset, and data linkages 516. The data linkages 516, for example, may cause the design asset to change automatically when data in the data linkage changes. These behaviors 506 are intended only as examples of possible behaviors that may be included in a chattel, and are not intended to be limiting.

The metadata 508 included in the chattel 502 comprises any additional information usable to control the chattel. For instance, the metadata 508 can include access level data 518, license data 520, creator data 522, behavior links 524, and so forth. The access level data 518 provides information about different access levels that a creator has assigned to a design asset, such as user types that can access the behaviors 506. The license data 520 may provide information about specific entities that can edit the behaviors 506 included in the chattel 502. For example, the creator may grant a license to a primary developer to develop a set of behaviors for the chattel or to generate custom behaviors that are not possible with the creator's design software. The creator data 522 provides information about the creator of the chattel 502, such as a first and last name, a company name, copyright information, and so forth.

The behavior links 524 provide information about how the chattel responds to its environment. For instance, the behavior links 524 can include information on how the chattel 502 interacts with other chattels when the chattel 502 is placed in a medium with the other chattels. The behavior links 524 can include links to data that may cause the design asset to respond in a particular manner. For example, a chattel may include a behavior to cause a computing device to change color of the design asset as time passes during the day, and a behavior link may continuously provide information to the chattel on the time of day. The metadata 508 described are intended only as examples of possible metadata that may be included in a chattel, and are not intended to be limiting.

Figure 6:
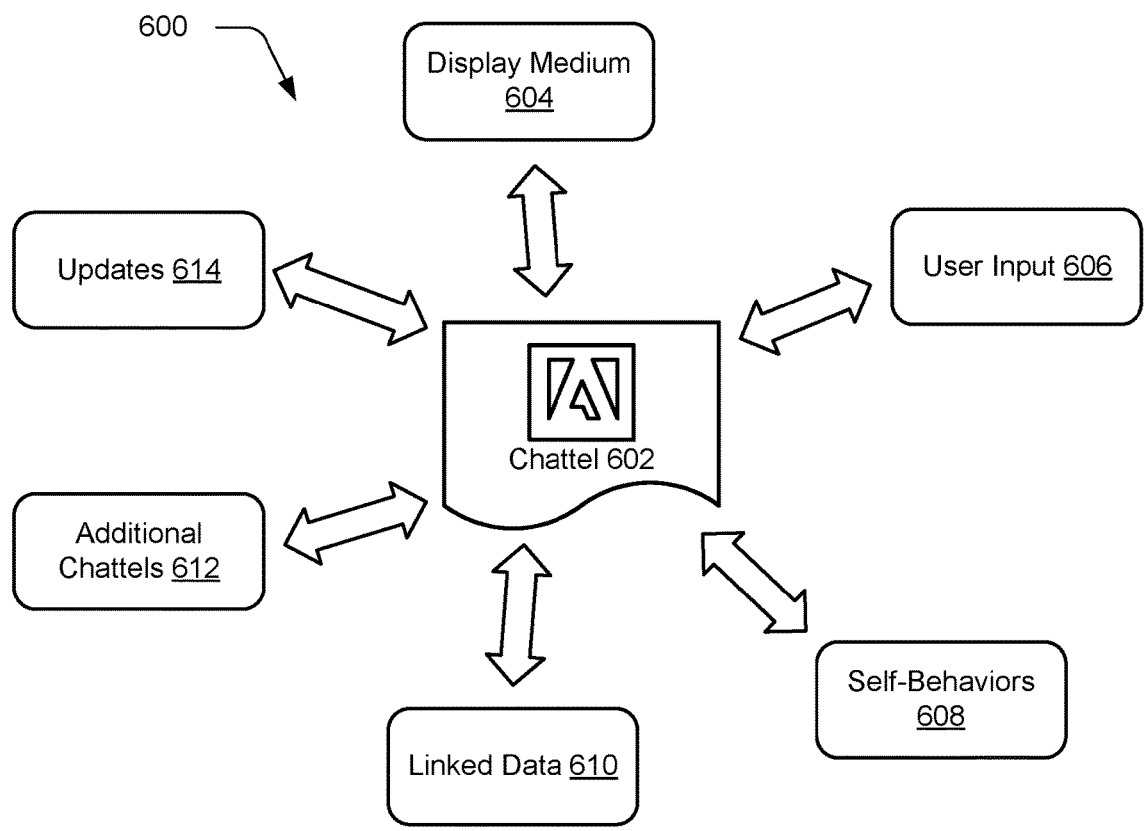
FIG. 6 depicts an example of what may be included in a chattel as implemented by the chattel creation and management techniques described herein.

FIG. 6 depicts examples of different components that may interact with a chattel generally at 600, which may be used in an example implementation for creating and managing chattels to control design asset behaviors. As described herein, chattels provide design assets with the ability, when executed by a computing device, to respond to an environment, interactions, and data in accordance with a creator's specified intent. Environment generally refers to conditions in which the chattel is used. Environment may include a platform that the chattel is used in (i.e., design software like Adobe Photoshop™ or Adobe Illustrator™, the Internet, mobile device, virtual reality, and so forth), a medium that the chattel is used for (i.e., to make a poster, to make a responsive website, to form a selectable icon, and so on), and context surrounding the chattel (i.e., a background where a design asset of the chattel appears, objects or other chattels that appear nearby a design asset of the chattel, and so forth). Interaction is any form of input given to the chattel such as by a human user, including touch, voice, or gesture inputs for example. Data refers to any form of linked, dynamic metric that can change according to external parameters, such as number of sales, number of users, time of day, election results, and so on.

To illustrate, a chattel 602 is depicted with example components with which the chattel can interact. The chattel 602 can interact with a display medium 604. The display medium 604 may be design software of an end-designer who is modifying an instance of a design asset in the chattel. The display medium 604 may be an application being executed on a mobile device. In another example, the display medium 604 may be a web page being displayed on a web browser. Interactions with the display medium 604 may include detecting the type of display medium, permitting different behaviors to be accessed based on the type of display medium, communicating metadata included in the chattel 602 to the display medium, optimizing presentation of a design asset included in the chattel based on the display medium, and so on.

The chattel 602 can also interact with a user input 606. In one example, an instance of the chattel 602 in an end-designer's workspace may respond to user inputs 606 such as a mouse input to resize the design asset, change a color of the design asset, add attributes to the design asset, and so forth. In the same example, the instance of the chattel 602 in the end-designer's workspace may respond to user inputs 606 such as a keyboard input to move the design asset to another location, add or change text appearing in the design asset, delete a component of the design asset, and so on. In another example, the instance of the chattel 602 appearing within a web page being displayed to an end-user may respond to user inputs 606 such as a touch input to zoom in on the design asset on the web page, a user input 606 such as a voice input to enhance the design asset, and so on.

The chattel 602 can additionally interact with self-behaviors 608. In other words, behaviors of the chattel 602 can interact with one another. In an example, an end-designer may be working with an instance of the chattel 602 in a workspace. The chattel 602 may include a set of themes as variations of how the design asset of the chattel is presented, such as a summer theme and a winter theme. When the end-designer selects the summer theme variation, for instance, self-behaviors 608 can then interact to cause the computing device to permit access by the end-designer to a subset of behaviors that are associated with the summer theme variation. When the end-designer is utilizing the summer theme variation, the end-designer may not have access to behaviors that are only accessible when the winter theme variation is being utilized, based on the self-behaviors 608.

Further, the chattel 602 can interact with linked data 610. Linked data may include one or more of uniform resource indicators (URIs), HTTP URIs, resource description framework (RDF) specifications, and so on. Linking the chattel to the linked data 610 allows the chattel to change in accordance with the intent of the creator, without the creator having to manually update the chattel each time they want the chattel to change. Additionally, because all instances of the chattel are linked to the original version of the chattel, the creator can designate each instance of the chattel to change wherever the chattel may appear automatically and without intervention by the creator using the linked data 610.

The chattel 602 can also interact with additional chattels 612. First, two or more chattels can be grouped together to form a combined chattel. The combined chattel can then be converted into its own chattel with visual and/or auditory forms, behaviors, and access levels that encompass all of the chattels that have been grouped together. The multiple chattels that are grouped together in the combined chattel can communicate information about behaviors and access levels between one another during execution. For example, a chattel in the combined chattels that has the most restrictions for a particular access level may cause the other chattels to inherit the narrower restrictions in order to prevent unauthorized changes being made to any of the chattels in the group.

Even when multiple chattels are not grouped together into a single combined chattel, multiple chattels may still communicate with one another. In one example, again consider an end-designer creating a web page in a design workspace of a computing device. The end-designer may place two chattels representing selectable icons in the design workspace and resized them to be a same size as one another. When the end-designer adds a third chattel representing a selectable icon to the design workspace, the third chattel may communicate with the two chattels already present in the design workspace and resize to the same size as the other two selectable icon chattels automatically and without user intervention. Any time a new chattel is added to a medium, the new chattel detects other chattels in the medium and can respond accordingly. Further, when the new chattel is added to the medium, the chattels that are already present can also detect that a new chattel has been added and can respond accordingly.

The chattel 602 can additionally interact with updates 614. There may be numerous instances of the chattel 602 that are being used by end-designers, or being consumed by end-users through interaction with a computing device. However, all of these instances of the chattel 602 are linked to the original chattel, which may be updated at any time by the creator of the chattel 602. When the creator makes updates 614 to the original chattel 602, the updates are reflected wherever the instance of the chattel may appear. This greatly reduces the amount of time the creator must spend when the creator wants to update a design asset contained in the chattel, because the creator only has to update the design in one location rather than hundreds or thousands of locations.

The updates 614 can also include modifications made by end-designers to instances of the chattel 602. Because the end-designers are only permitted access to certain behaviors that are designated by the creator of the chattel 602, the creator does not need to worry about unauthorized modifications being made to the design asset within the chattel. However, the end-designers are free to modify the instance of the chattel within the permitted constraints, giving the end-designers a substantial amount of freedom to update the instance of the chattel. The updates 614 made by the end-designers can be saved as variations of the design asset within the chattel in a central storage location or library, and then can be accessed by other end-designers. This technique reduces time wasted by both the creator and by end-designers on variations of a design asset that may never be used, but also allows for end-designers to create permitted variations as needed and easily access permitted variations that have been created by others.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-6.

Figure 7:
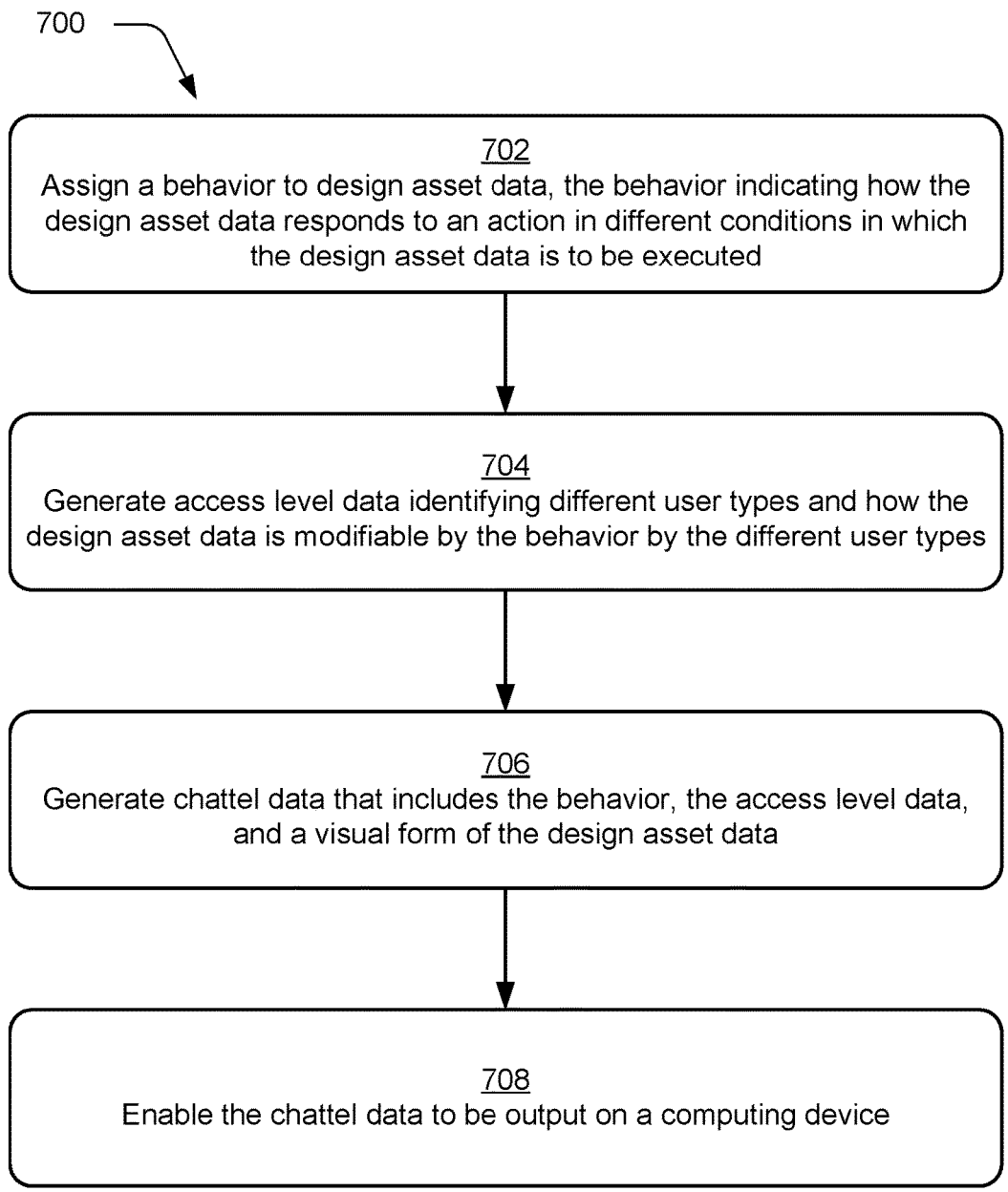
FIG. 7 is a flow diagram depicting a procedure in an example implementation in which a chattel is created in a digital content creation system.

FIG. 7 depicts a procedure 700 in an example implementation in which a behavior is assigned to design asset data by a computing device of a digital content creation system. The behavior is assigned to the design asset data (block 702). The behavior indicates how the design asset data responds to an action in different conditions in which the design asset data is to be executed. The action may be performed as part of an interaction, an environment, or data in different conditions through execution of a computing device. The design asset data 202 may be visual and/or auditory data created by a digital media content creator. The behavior 206 assigned by the behavior assignment module 204 may indicate how the design asset data 202 responds to an environment in which the design asset data may appear, how the design asset data responds to interactions by users, how the design asset data responds to external data, and so forth, examples of which are discussed in detail above.

Then, access level data identifying different user types and how the design asset data is modifiable by the behavior by the different user types is generated (block 704). The access level data 210 generated by the access level generation module 208, for instance, can indicate that one user type has access to the behavior 206 of the design asset data 202 while another user type does not have access to the behavior. The access level generation module 208 can generate access level data 210 for primary developer user types, end-designer user types, and end-user user types, to name a few examples.

After generating the access level data, chattel data is generated that includes the behavior, the access level data, and a visual form of the design asset data (block 706). The behavior 206 may be included by the chattel generation module 212 in the chattel data 214 as scripts that control the behavior of the design asset data 202. The access level data 210 may be included by the chattel generation module 212 in the chattel data 214 as metadata that provides information on which user types can access the behavior 206. The visual form of the design asset data may be included by the chattel generation module 212 in the chattel data 214 as a .png file, a .obj file, and so on. The chattel generation module 212 links the behavior, the access level data, and the design asset data into a single package, allowing a creator of the chattel data 214 to maintain control over their design and how their design is used. Once the chattel generation module 214 generates the chattel data 214, the chattel output module 216 enables the chattel data to be output by a computing device (block 708), e.g., for output in a user interface 220 of a user interface module 218, to a service provider system 102 in order to allow end-designers to make use of the design asset based on their user type, and so forth.

Figure 8:
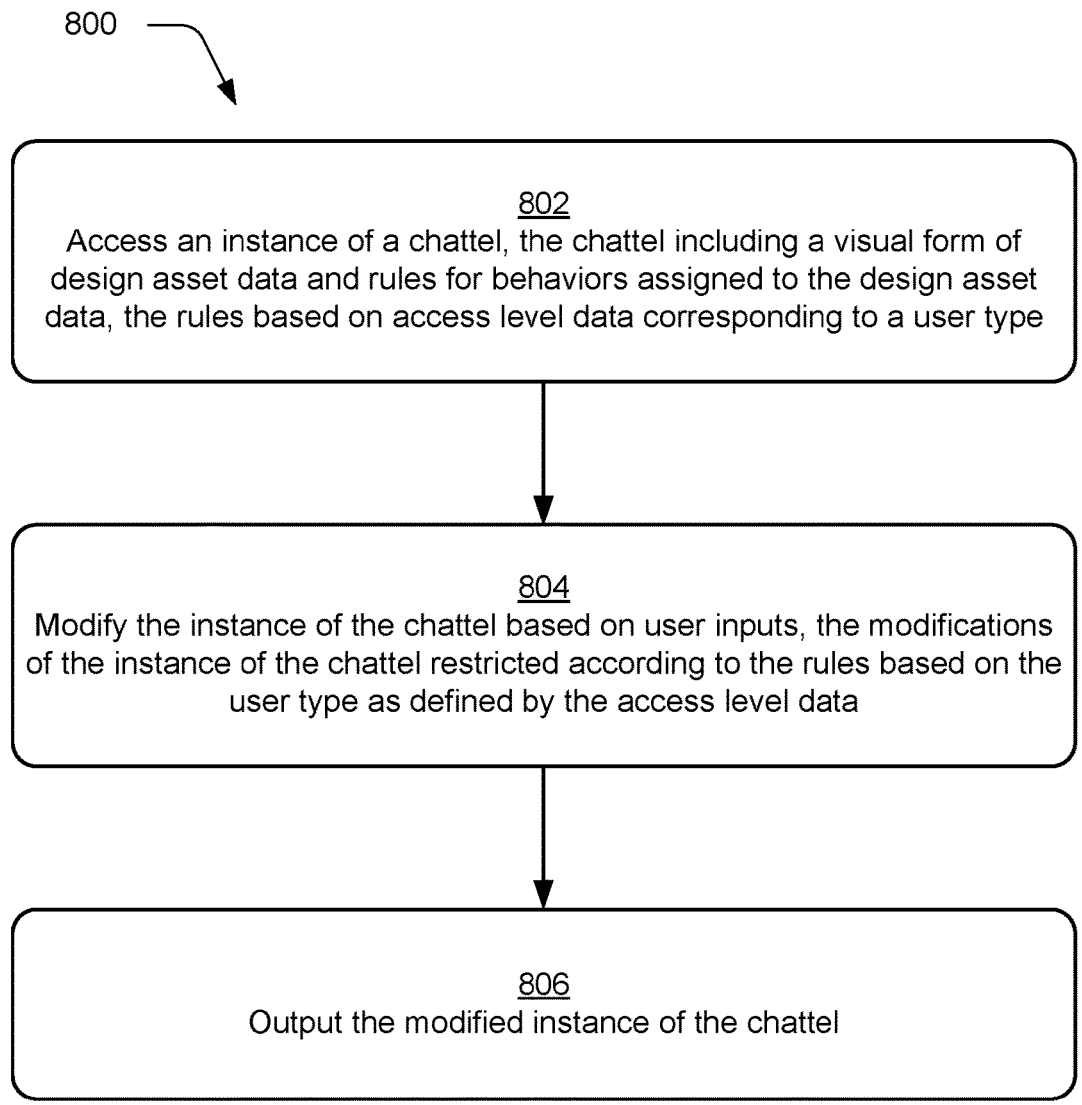
FIG. 8 is a flow diagram depicting a procedure in an example implementation in which a chattel is consumed in a digital content creation system.

FIG. 8 depicts a procedure 800 in an example implementation in which characteristics of design asset data are modified in a digital content creation system. First, an instance of a chattel is accessed (block 802). The chattel includes a visual form of design asset data and rules for behaviors assigned to the design asset data, where the rules are based on access level data corresponding to a user type. The chattel access module 302 can request to access the chattel 122 located at the service provider system 102. In response to the request, the chattel access module 302 accesses a chattel instance 304 of the chattel 122. The chattel instance 304 only includes permitted design asset data 124 and permitted behaviors 126 to be temporarily downloaded to a designer client device 106, based on a user type of a user of the designer client device. The rules for the behaviors assigned to the design asset data allow a user of the designer client device 106 to access certain behaviors 126 based on the user type of the user and based on the access level data 128 for the user type included in the chattel 122.

Then, the instance of the chattel is modified based on user inputs (block 804). The modifications of the instance of the chattel are restricted according to the rules based on the user type as defined by the access level data. The chattel modification module 306 can modify the chattel instance 308 based on user inputs such as mouse inputs, touch inputs, voice inputs, keyboard inputs, and so on. However, the chattel modification module 306 prevents any modifications to the chattel instance 304 that are not permitted by the access level data 128 and the user type of the user of the designer client device 106. For instance, the chattel modification module 306 can permit the user of the designer client device 106 to access a particular behavior of the chattel 122 that allows the user to modify the chattel instance 304, while preventing access to a different behavior of the chattel 122 as indicated by the access level data 128.

Next, the modified instance of the chattel is output (block 806), e.g., for output in a user interface 314 of a user interface module 312, automatically and without user intervention to a service provider system 102 where the modifications can be reviewed by a creator of the chattel, to an end-user client device 108 as part of an another item of digital content, and so on. Automatically outputting the modified chattel instance 304 to the service provider system 102 allows a creator of the design asset data 124 and the chattel 122 to continuously monitor how their design asset is being modified by different end-designers, as the chattel itself is centrally located and constantly accessible by the creator. Further, because end-designers only include an instance of the chattel when they output their designs to end-users, end-users are subject to the rules of the access data 128 as well based on their user type. This prevents illegitimate uses of the design asset by both end-designers and end-users and gives creators more control over their design assets.

Example System and Device

Figure 9:
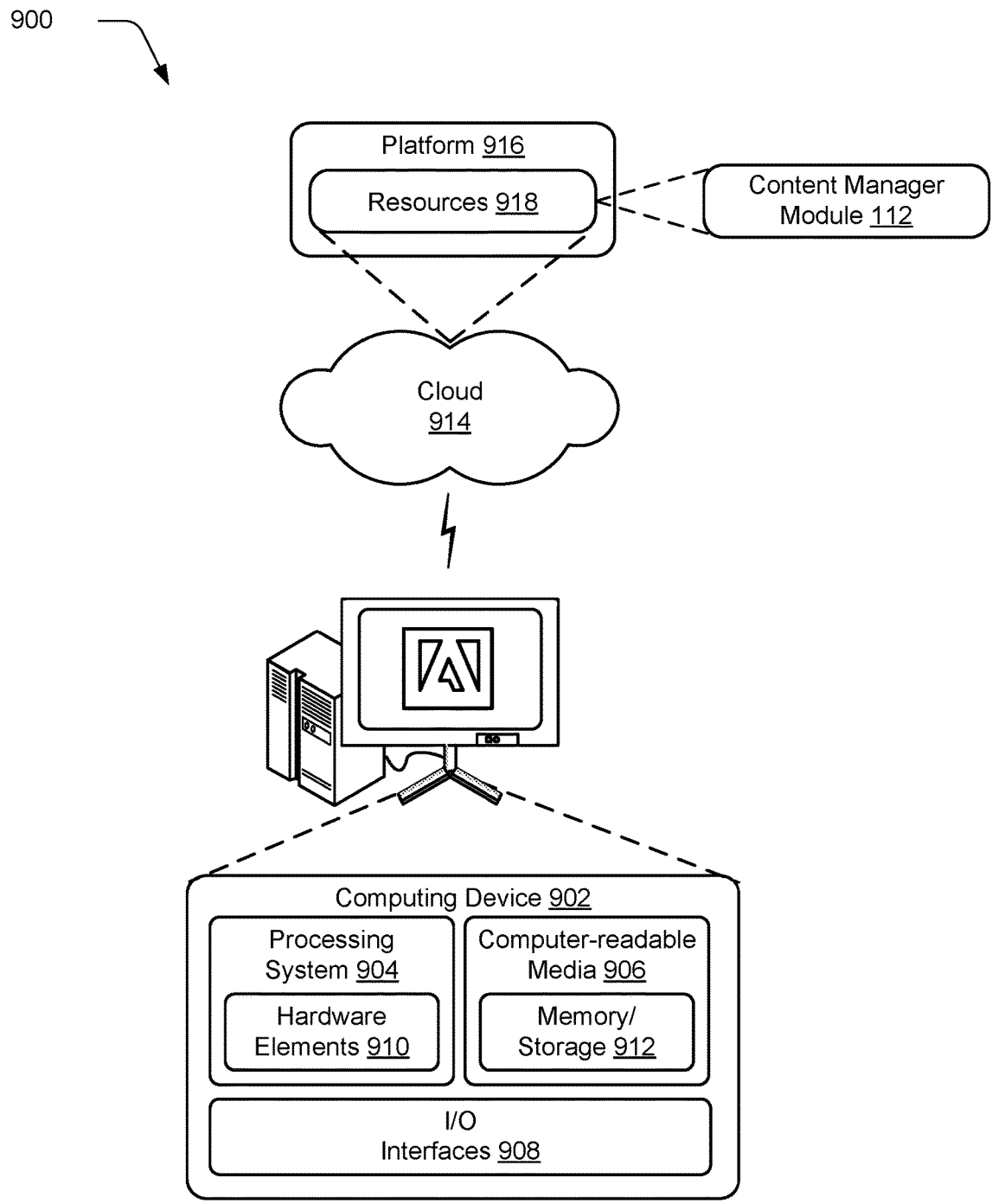
FIG. 9 illustrates an example system including various components of an example device that can be implemented as any type of computing device as described and/or utilize with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. This is illustrated through inclusion of the content manager module 112. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to assign a behavior to design asset data, a method implemented by at least one computing device of a digital content creation system, the method comprising:
   assigning the behavior to the design asset data, the behavior indicating how the design asset data responds to an action in different conditions in which the design asset data is to be executed;
   generating access level data identifying different user types and how the design asset data is modifiable by the behavior by the different user types;
   generating chattel data that includes the behavior, the access level data, and a visual form of the design asset data, the behavior included in the chattel data comprising a script indicating how the design asset data responds to the action in the different conditions and the access level data included in the chattel data comprising metadata that identifies the different user types and how the design asset data is modifiable by the behavior by the different user types; and
   enabling the chattel data to be outputted on a computing device.

2. The method of claim 1, wherein the different user types comprise a first user type and a second user type, and wherein the access level data permits access to the behavior by the first user type and restricts access to the behavior by the second user type.

3. The method of claim 1, wherein the chattel data further includes one or more variations of the design asset data.

4. The method of claim 1, wherein the behavior includes a data linkage that causes the design asset data to change automatically when data in the data linkage changes.

5. The method of claim 1, wherein the chattel data is configured to detect other chattels when output and respond to communication from the other chattels.

6. The method of claim 1, wherein enabling the chattel data to be output comprises outputting the chattel data to a service provider system and making the chattel data available to users of the service provider system.

7. The method of claim 1, further comprising:
   modifying a property of the design asset data;
   assigning an additional behavior to the design asset data;
   indicating which of the different user types identified by the access level data are subject to the modified property of the design asset data and the assigned additional behavior; and
   automatically updating the chattel to include the modified property of the design asset data and the additional behavior based on the indicated different user types wherever the chattel is output.

8. In a digital medium environment to modify characteristics of design asset data in a digital content creation system, a system comprising:
   a chattel access module implemented at least partially in hardware of a computing device to access an instance of a chattel, the chattel including a visual form of the design asset data and rules for behaviors assigned to the design asset data, the rules based on access level data corresponding to a user type, the access level data included in the chattel comprising metadata that identifies different user types and how the design asset data is modifiable by a behavior by the different user types, the rules for behaviors assigned to the design asset data indicating how the design asset data responds to an action in different conditions; and
   a chattel modification module implemented at least partially in hardware of the computing device to modify the instance of the chattel based on user inputs, the chattel modification module restricting modification of the instance of the chattel according to the rules based on the user type as defined by the access level data.

9. The system as described in claim 8, further comprising a chattel combination module implemented at least partially in hardware of the computing device to combine the chattel with one or more other chattels to form a combined chattel, and to assign an additional behavior to the combined chattel.

10. The system as described in claim 8, further comprising a medium creation module implemented at least partially in hardware of the computing device to create a medium comprising the instance of the chattel and one or more additional chattel instances, wherein the instance of the chattel and the one or more additional chattel instances within the medium are configured to communicate the rules for behaviors with one another.

11. The system as described in claim 10, further comprising a communication module implemented at least partially in hardware of the computing device to communicate the instance of the chattel and the one or more additional chattel instances within the medium to a client device, wherein the access level data indicates that a user type of the client device further restricts modification of the instance of the chattel.

12. The system as described in claim 8, further comprising a communication module implemented at least partially in hardware of the computing device to automatically communicate the modifications to the instance of the chattel to a service provider system.

13. The system as described in claim 8, wherein the chattel further includes variations of the design asset data that are accessible via accessing the instance of the chattel with the chattel access module.

14. The system as described in claim 13, wherein the variations of the design asset data have different rules for behaviors based on the access level data corresponding to the user type.

15. In a digital medium environment to assign a behavior to design asset data in a digital content creation system, a system comprising:
- at least a memory and a processor to perform operations comprising:
  - assigning the behavior indicating how the design asset data responds to an action in different conditions in which the design asset data is to be executed;
  - generating access level data corresponding to different user types, the access level data configured to identify different user types and how the different user types can modify the design asset data using the behavior;
  - generating chattel data that includes the behavior, the access level data, and a visual form of the design asset data, the behavior included in the chattel data comprising a script indicating how the design asset data responds to the action in the different conditions and the access level data included in the chattel data comprising metadata that identifies the different user types and how the design asset data is modifiable by the behavior by the different user types; and
  - outputting the chattel.

16. The system as described in claim 15, wherein the different user types comprise a first user type and a second user type, and wherein the access level data permits access to the behavior by the first user type and restricts access to the behavior by the second user type.

17. The system as described in claim 15, wherein the chattel data is configured to detect other chattels when output and respond to communication from the other chattels.

18. The system as described in claim 15, wherein the outputting the chattel data further comprises outputting the chattel data to a service provider system making the chattel data available to users of the service provider system.

19. The system as described in claim 15, wherein the chattel data further includes one or more variations of the design asset data.

20. The system as described in claim 15, wherein the behavior includes a data linkage that causes the design asset data to change automatically when data in the data linkage changes.

* * * * *